United States Patent
Lorenz et al.

(10) Patent No.: US 7,872,479 B2
(45) Date of Patent: Jan. 18, 2011

(54) LEAK TESTING AND LEAK LOCALIZATION ARRANGEMENT FOR LEAK TESTING AND LEAK LOCALIZATION FOR FLAT ROOFS OR THE LIKE

(76) Inventors: Bernd Lorenz, Hoesbacher Weg 39, Goldbach (DE) 63773; Markus Bruehl, Hoesbacher Weg 39, Goldbach (DE) 63773; Klaus Burger, Hoesbacher Weg 39, Goldbach (DE) 63773

(*) Notice: Subject to any disclaimer, the term of this patent is extended or adjusted under 35 U.S.C. 154(b) by 0 days.

(21) Appl. No.: 11/912,769

(22) PCT Filed: Apr. 25, 2006

(86) PCT No.: PCT/EP2006/003815
§ 371 (c)(1), (2), (4) Date: Oct. 26, 2007

(87) PCT Pub. No.: WO2006/117100
PCT Pub. Date: Nov. 9, 2006

(65) Prior Publication Data
US 2008/0143349 A1     Jun. 19, 2008

(30) Foreign Application Priority Data
Apr. 29, 2005     (DE) .................. 20 2005 006 827

(51) Int. Cl.
*G01R 31/08* (2006.01)
*B32B 3/00* (2006.01)
(52) U.S. Cl. .................. 324/691; 324/525; 428/57
(58) Field of Classification Search .................. 324/691, 324/512, 513, 519, 525; 428/57
See application file for complete search history.

(56) References Cited

U.S. PATENT DOCUMENTS

| | | | | |
|---|---|---|---|---|
| 4,404,516 A | * | 9/1983 | Johnson, Jr. ................. | 324/557 |
| 4,468,422 A | * | 8/1984 | Siener et al. .................. | 428/57 |
| 4,563,379 A | * | 1/1986 | Kruger ........................ | 428/61 |
| 4,565,965 A | * | 1/1986 | Geesen ........................ | 324/718 |
| 5,722,791 A | * | 3/1998 | Dallmer ........................ | 405/52 |
| 6,102,157 A | * | 8/2000 | Goldbach et al. ........... | 182/128 |

(Continued)

FOREIGN PATENT DOCUMENTS

DE     3701130 A1     7/1988

(Continued)

*Primary Examiner*—Timothy J Dole
*Assistant Examiner*—Farhana Hoque
(74) *Attorney, Agent, or Firm*—Brooks Kushman P.C.

(57) ABSTRACT

In a leak testing and leak localization arrangement for leak testing and localization for flat roofs or the like which are sealed by at least one electrically insulating sealing web (6), at least one voltage source (12) is applied between an upper side of the sealing web and below an underside of the sealing web. The upper side of the sealing web is sampled by means of a measuring device (9) provided with two measurement sensors (10, 11). In order to achieve reliable leak testing and precise leak localization with contact being made in an uncomplicated manner with the voltage source (12), web-shaped electrically conductive material is arranged on the underside of the sealing web (6) and is connected to one terminal of the voltage source (12). For this purpose, at least one metal grating web is provided as the web-shaped electrically conductive material, which web can be laid easily and is non-combustible and durable.

13 Claims, 1 Drawing Sheet

Figure 1:
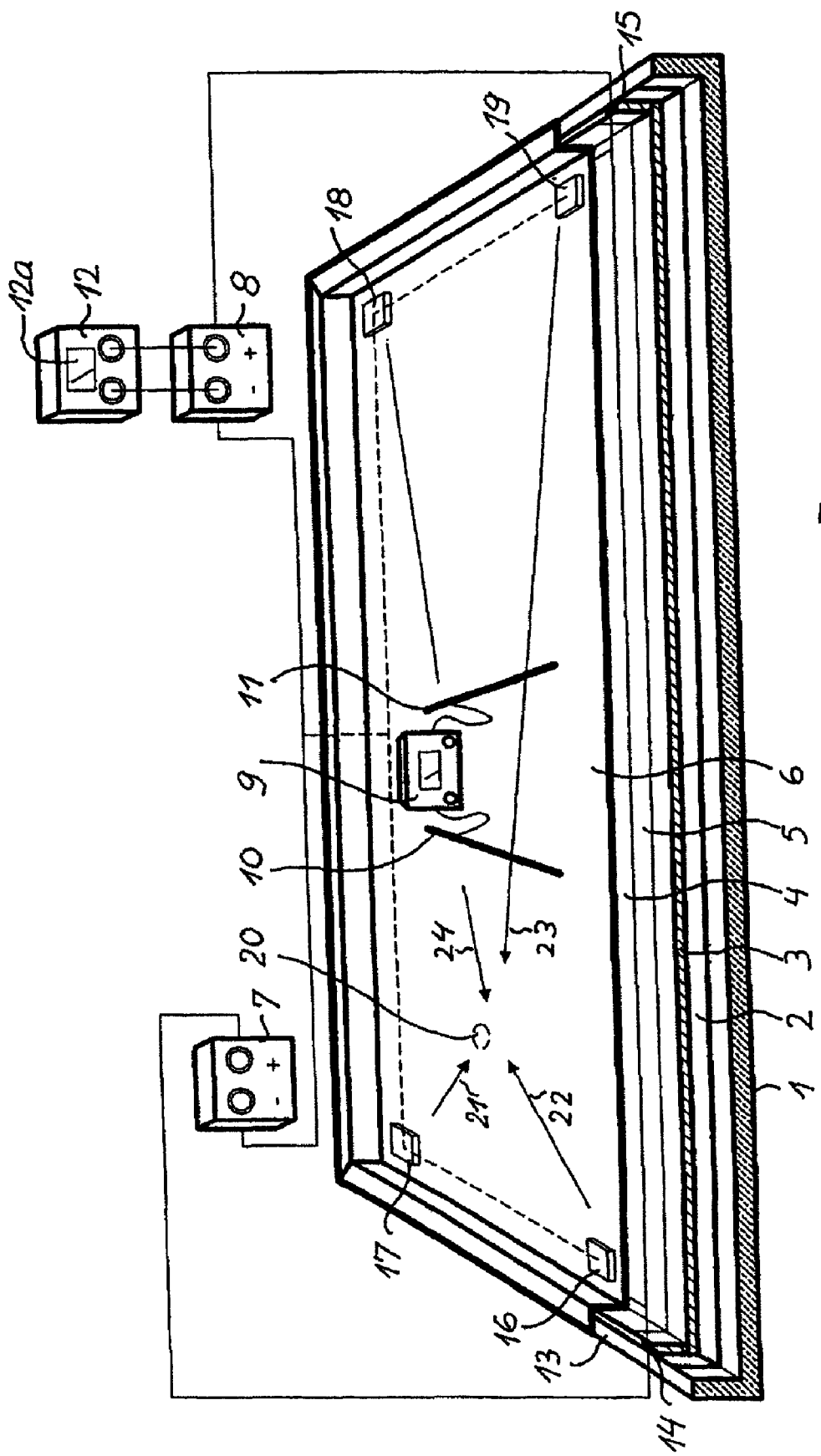

U.S. PATENT DOCUMENTS 6,622,444 B2 * 9/2003 Zarate Sanchez et al. 52/309.11
6,650,125 B1 * 11/2003 Youngquist ................. 324/658

FOREIGN PATENT DOCUMENTS

| | | | |
|---|---|---|---|
| DE | 10036362 | A1 | 1/2002 |
| DE | 19914658 | C2 | 10/2003 |
| EP | 1052491 | A1 | 11/2000 |
| GB | 2373057 | A | 9/2002 |
| WO | 0001895 | A1 | 1/2000 |

* cited by examiner

LEAK TESTING AND LEAK LOCALIZATION ARRANGEMENT FOR LEAK TESTING AND LEAK LOCALIZATION FOR FLAT ROOFS OR THE LIKE

The invention relates to a leak testing and leak localization arrangement for leak testing and leak localization for flat roofs or the like according to the preamble of Claim 1.

It therefore also relates to leak testing and leak localization of flat inclined roofs, underground garages, roof car parks, ponds and depots.

In a known apparatus such as this for localization of leak points in flat roofs, the voltage source is a generator which generates direct-current pulses, whose positive pole is connected to the damp point which has been found under a flat roof, and whose negative pole is connected to the metallic guttering of the flat roof, or to a bare cable placed on the flat roof (EP 0 125 460 B1). The flat roof typically has a roof skin of roofing felt, which is adhesively bonded in a plurality of layers or webs one above the other and to one another. The apparatus also includes a test set which compares the pulse amplitudes supplied to the test set via two measurement sensors for scanning the roof with one another and indicates the higher pulse amplitude by means of an indication instrument equipped with a centre point. The method carried out using this apparatus is therefore dependent upon a damp point being formed under the flat roof once moisture has penetrated completely through the flat roof, that is to say for example additionally through insulation, a vapour barrier and a concrete ceiling arranged under the roof sealing. The method is also dependent on a damp point that has been formed in this way being identified and on one pole of the voltage source, the positive pole, being connected to the damp point, which is difficult to do and in some circumstances can cause otherwise unnecessary damage to the damp point. On the other hand, in order to repair a flat roof which has been damaged in this way, it may be necessary to repair its more deeply located layers under an upper sealing web.

An arrangement for carrying out a method for leak localization of leak points on flat roofs or the like in which an alternating voltage from an alternating-voltage source is applied between the upper face and the lower face of the flat roof, for which purpose a scanning conductor in the form of a measurement rod is provided on the upper face, by means of which the surface of the flat roof is scanned at points (EP 1 052 491 A1) essentially has the same disadvantages. The closer the scanning conductor is located to the leak point, the greater the measurement signal which is passed to a headset becomes.

The prior art also includes an arrangement for leak detection and leak localization of liquid leakage fluids which electrically have at least low conductivity, on electrically non-conductive sealing systems, with the sealing system comprising an electrically insulated between two non-conductive layers, and an electrical resistance layer which is sealed with respect to the fluid, and with the fluid being grounded at least with a high impedance (DE 199 14 658 C2). A plurality of electrical connecting conductors are connected to the electrical resistance layer, and are connected to a grounded electrical voltage source. An ammeter is connected in each of the connecting conductors, and can be used to measure a leakage current. Furthermore, a leak is localized using the ratio of the detected currents in the individual connecting conductors. The resistance layer can be surrounded at the edge by a shielding electrode in the form of an electrical conductor, which is connected to the same electrical potential as the resistance layer. This arrangement therefore uses a relatively complex electrical resistance layer, which is intended to have an at least approximately constant surface resistance. The evaluation of the leakage currents flowing through the connecting conductors is complicated, particularly when the aim is to localize a leak accurately by using a large number of connecting conductors.

It is admittedly also known (paragraph [0003] in the above DE 199 14 658 C2) for at least two sensor lines, which are not connected to one another when no defects are present, in leak testing systems to be bridged by the ingress of the electrically conductive liquid and therefore to trigger an alarm, in particular by detecting electrical resistances between line strips on the flat seals. However, this allows only leak identification, but not leak localization.

The present invention is therefore based on the object of providing a leak testing and leak localization arrangement which allows uncomplicated leak testing and leak localization, in which the leak localization is nevertheless accurate, and which is not dependent on any damp points on a flat roof, through which water has penetrated, including its sealing and insulation system.

This object is achieved by a leak testing and leak localization arrangement which has the features of Claim 1.

Accordingly, electrically conductive material which is in the form of a web and is connected to one pole of a voltage source is arranged on the lower face of the sealing web, which is therefore located at a lower level than its upper face, but above a concrete ceiling of the flat roof (or profiled metal sheeting or wooden substructure) and, if appropriate, a vapour barrier and insulation. The web, which is equipped with electrically conductive material and is also referred to as a web composed of electrically conductive material, is advantageously a metal grating web which can be laid easily, is not combustible, and allows reliable leak testing and sufficiently accurate leak localization after installation in the electrical circuit arrangement.

The web composed of electrically conductive material can make contact with at least one contact plate which is permanently fitted at one point on the edge of this web. This contact plate or its supply line is preferably passed in an electrically insulated form through the sealing web applied to the upper face of the flat roof. The web composed of electrically conductive material is therefore arranged in the immediate vicinity of the upper insulating sealing web, and may be separated from it just by a separating felt. The second pole of the voltage source can be connected to a ring line, which is arranged on the sealing web at its edge, see Claim 3, or else preferably to at least one mobile sealing web contact plate, which is placed on the electrically insulating sealing web.

The mobile sealing web contact plate can thus be placed on the sealing web such that it allows a leak to be localized quickly and accurately by the test set using two measurement sensors, which can sample the upper face of the flat roof at positions, selected step-by-step, with respect to the sealing web contact plate, in order to allow an approximation to the sought leak by interpretation of the measurement result, for example of a pointer deflection. The sampling points are chosen by the operator, who records the current flowing through the test set, and the strength and direction of the current can be indicated by the test set.

For precise leak localization, Claim 13 proposes that, on the one hand, at least two mobile sealing web contact plates be connected to the voltage source and that, on the other hand, the web composed of electrically conductive material or metal grating web be electrically connected to the voltage source, and that the mobile sealing web contact plates be placed on the flat roof at points at a distance from one another.

This increases the probability that a leak point will be located in the vicinity of one of the sealing web contact plates, where a relatively large voltage drop occurs, which allows quick and exact leak localization of the leak point by means of the two measurement sensors.

The use of the mobile sealing web contact plates is particularly advantageous when there is vegetation, gravel, plates or some other load on the flat roof, which exacerbates the installation of a ring line. The ring line could also be damaged by bad weather or by people walking on it. In contrast, this disadvantage can be avoided when the mobile sealing web contact plates are used only temporarily for leak testing and/or leak localization. Furthermore, as mentioned above, the mobile sealing web contact plates allow a leak that has been found but has not yet been localized exactly to be found more quickly, in that the area to be investigated is restricted by the mobile sealing web contact plates.

The sealing web contact plates or ring line are expediently composed of a corrosion-resistant conductive material, in particular Nirosta or galvanized copper material.

The web composed of electrically conductive material or metal grating web is normally intended to be isolated from the building ground by means of electrical insulation. The web composed of electrically conductive material or metal grating web is, in particular, intended not to be grounded during leak testing and leak localization, in order to produce a defined circuit. The special case of grounding temporarily will be described further below.

For simple laying the web composed of electrically conductive material or metal grating web is preferably firmly connected to the insulating sealing web, so that a single laying process for the sealing web and the web composed of electrically conductive material or metal grating web is sufficient, after which the metal grating web is located under the sealing web.

According to Claim 9, the web composed of electrically conductive material or metal grating web can, however, also be located directly between an upper insulating sealing web and a lower insulating layer in the flat-roof structure. In this case as well, the webs, specifically the upper sealing web and the lower insulating layer, between which the web composed of electrically conductive material or metal grating web is located, can advantageously be connected to form a unit.

According to Claim 10, this can be done particularly advantageously for two bituminous layers as sealing webs by connecting the two bituminous layers to one another through the metal grating web, and/or by connecting them to the lower insulating layer, in that the bituminous layers are heated such that bitumen flows through the metal grating web and solidifies as it subsequently cools down. This is also applicable to cold-self-adhesive systems.

Analogously to this, the webs composed of electrically conductive material may be arranged under two bituminous layers which are connected directly to one another and to the lower insulating layer by heating and subsequently cooling down.

In general, the arrangement of at least one web composed of electrically conductive material or metal grating web between the two insulating sealing webs not only makes it possible to improve the reliability of the seal on the flat roof, but a damaged upper sealing web can be identified at this stage and its leak point can be located even when the lower sealing web is still intact. This makes it possible to prevent the ingress of water in the case of a leaky upper sealing web, for example in the area of a welded seam, between the two webs leading to more rapid ageing of the sealing arrangement.

In all of the arrangements mentioned above of the webs composed of electrically conductive material or metal grating webs with respect to the insulating sealing web, it is possible, according to Claim 4, to lay a plurality of such webs overlapping one another in an overlap area, and thus making contact with one another, which has the advantage that the individual webs composed of electrically conductive material or metal grating webs can be easy to handle. In order to check the correct overlap and thus that contact is made before a leak test and leak localization, the overlap area of the webs composed of electrically conductive material is connected in an electrical monitoring circuit, which can be activated alternatively, instead of the voltage source, for scanning of the upper face of the flat roof.

According to Claim 5, the monitoring circuit is preferably a resistance measurement circuit with an ohmmeter which can be connected to points, which are at a distance from one another, on the overlapped webs composed of electrically conductive material, including the overlap area, to be precise in particular to the contact plates which are also used for the actual leak testing and leak localization on the webs composed of electrically conductive material, or else to external connections, via which the webs composed of electrically conductive material are connected to the voltage source for leak testing and leak localization, with the voltage source being switched off while the monitoring circuit is activated, or being switched such that the voltage source does not interfere with the monitoring circuit.

Two functions are therefore carried out in the leak testing and leak localization arrangement to which the monitoring circuit has been added, specifically monitoring of the overlapping laying of the webs composed of electrically conductive material or metal grating webs, and then the leak testing and leak localization.

In addition, the web composed of electrically conductive material or metal grating web makes it possible to achieve protection against high- or low-frequency electromagnetic radiation, including electrosmog, without any significant complication to the arrangement. For this purpose, according to Claim 7, this web can alternatively be connected to an electrical ground connection in order to isolate it from the building ground, during the activation of the monitoring circuit or the actual leak testing and leak localization.

According to Claim 6, for the actual leak testing and leak localization, an electrical potential difference is always produced by the switched-on voltage source between the upper face of the flat roof, which for this purpose is wetted with water, and the web composed of electrically conductive material or metal grating web.

The voltage source may be a direct-current source or preferably, according to Claim 8, a pulse transmitter which produces unipolar pulses at time intervals of three to five seconds. In the latter case, the leak test and leak localization are particularly reliable, which can be explained by the fact that polarization phenomena at damp points in the flat roof are avoided by continuous application of a voltage of the same polarity. For the same reason, the polarity of the voltage source can advantageously be changed, and it is also possible to use a pulse transmitter as a voltage source to produce bipolar pulses, provided that the test set is designed to evaluate them.

One exemplary embodiment of the leak testing and leak localization arrangement according to the invention will be explained in the following test with reference to a drawing with one FIGURE, from which the features of the invention can be seen in detail.

FIG. 1 shows, schematically, an illustrative view of a leak testing and leak localization arrangement.

In FIG. 1, 1 denotes a concrete ceiling of a flat roof, above which a vapour barrier 2 and insulation 3, or insulation material, are arranged. A metal grating web 5 is located above this, and above it, and separated and isolated from it by a separating felt 4, an electrically insulated sealing web 6, which forms the upper face of the flat roof. The felt is used for protection of one or more plastic webs which may form the insulated sealing web against mechanical damage caused by the metal grating web. The sealing web 6 may be a plastic web, or else a bituminous layer. The metal grating web 5 can be designed as such, or else may be connected in the factory to the sealing web, in particular if it is in the form of a bituminous layer, in order to be laid with it. The metal grating web is laid such that it is not connected to the building ground, by maintaining an isolating gap from metal bodies which are connected to the building ground. For example, the metal grating web is cut out about 10 cm around a gully, although this is not illustrated in FIG. 1.

The metal grating web is itself non-combustible, and to this extent is advantageous, for fire protection reasons, for example in comparison to a PE sheet or a PP felt.

When the metal grating web is connected to a bituminous web as a sealing web 6, and to the insulating material, this ensures particularly good wind suction protection for the seal.

The equipment associated with the leak testing and leak localization arrangement includes a voltage source 12, which essentially comprises a pulse transmitter and is connected to two connecting boxes 7, 8. Furthermore, a mobile test set is provided, in the form of a sensitive ammeter or voltmeter with a needle deflection in both directions, and is connected to two moving measurement sensors 10 and 11, by means of which the surface of the flat roof can be scanned.

In the present exemplary embodiment, in each case one positive pole of the voltage source 12 is electrically firmly connected via the connecting boxes to the metal grating web, to be precise to opposite ends of the metal grating web, which may be composed of a plurality of relatively small metal grating webs with overlap areas parallel to an attic edge 13, in which the relatively small metal grating webs overlap one another, making contact.

In order to check that the metal grating web assembled in this way has been laid correctly and in order to check its overlap areas in particular, an ohmmeter, which is not illustrated, can be connected to the mutually opposite contact-making points of the assembled metal grating web 5.

The contact-making points 14, 15 can be provided by means of contact plates, which are not illustrated but are firmly connected in each case to one of the outer metal grating webs of the assembled metal grating web.

The drawing shows four mobile sealing web contact plates 16 to 19 for use for the actual leak testing and leak localization process, which are placed at a distance from one another in the area of the outer corners of the concrete ceiling, but, if required, can also be offset at a different point in order to form a circle around the leak point 20, as is indicated by the arrows 21 to 24. Alternatively, a ring line can also be used for this purpose.

The illustrated leak testing and leak localization arrangement is operated as follows:

before a leak test and, possibly, leak localization, a check is carried out to determine whether the assembled metal grating web has been laid correctly, that is to say relatively small metal grating webs which form the metal grating web 5 by overlapping are overlapped such that they make contact, which can be done at the contact-making points 14 and 15, which are included in a monitoring circuit, which is not illustrated, for resistance measurement.

The flat roof is then moistened on its surface, that is to say on the sealing web 6, and the leak testing and leak localization can be started by switching on the voltage source 12.

If a significant current flows after the voltage source 12 has been switched on, with this being indicated by the ammeter 12a, this indicates that a leak is present. The leak point 20 can then be localized by using the portable test set 9 to scan the upper face of the flat roof, using the measurement sensors 10 and 11. For this purpose, the sealing web contact plates are expediently first of all placed in the edge area of the flat roof. They can then be moved closer to the test set 9 or to the leak point 20 whose precise position is intended to be determined, thus restricting the area of the flat roof to be investigated, until the leak point is found by the maximum indication of the test set.

In this case, it is advantageous for the electrical resistance to be very low in the circuit in which the voltage source 12 is arranged, because of the metal grating web. The metal grating web may be designed to be corrosion-resistant, so that no significant increase in the resistance occurs over the course of time, even in the case of an assembled metal grating web. The metal grating web can easily be laid, particular when it has already been fitted to the sealing web, or integrated in it, in the factory. This allows cost-effective construction of the flat roof, with the leak testing and leak localization arrangement.

LIST OF REFERENCE NUMBERS

1 Concrete ceiling
2 Vapour barrier
3 Insulation
4 Separating felt
5 Metal grating web
6 Sealing web
7 Connecting box
8 Connecting box
9 Test set
10 Measurement sensor
11 Measurement sensor
12 Voltage source with
12a Ammeter
13 Attic edge
14 Contact-making point
15 Contact-making point
16 Sealing web contact plate
17 Sealing web contact plate
18 Sealing web contact plate
19 Sealing web contact plate
20 Leak point
21 Arrow
22 Arrow
23 Arrow
24 Arrow

The invention claimed is:

1. Leak testing and leak localization arrangement for leak testing and localization for one of a flat roof, flat inclined roof, underground garage, roof car park, pond, and depot, the arrangement comprising:
   at least one electrically insulating sealing web having an upper face and a lower face;
   at least one metal grating web made of an electrically conductive material, the grating web substantially covering the lower face of the sealing web;

at least one voltage source being applied between the upper face of the sealing web and under the lower face of the sealing web; and a test set with two measurement sensors by means of which the upper face of the sealing web can be scanned, wherein the at least one metal grating web is connected to one pole of the voltage source.

2. Leak testing and leak localization arrangement according to claim 1 further comprising at least one mobile sealing web contact plate, which is placed on the upper surface of the electrically insulating sealing web and is connected to a second pole of the voltage source.

3. Leak testing and leak localization arrangement according to claim 1, wherein a second pole of the voltage source is connected to a ring line on the sealing web.

4. Leak testing and leak localization arrangement according to claim 1, further comprising an electrical monitoring circuit, wherein the at least one metal grating web is at least two metal grating webs which are in contact with one another in an overlap area and are arranged under the sealing web, the overlap area connected to the electrical monitoring circuit in that the monitoring circuit can be activated on the metal grating webs as an alternative to the voltage source for scanning of the upper face of the flat roof.

5. Leak testing and leak localization arrangement according to claim 4, wherein the monitoring circuit is a resistance measurement circuit.

6. Leak testing and leak localization arrangement according to claim 1, wherein an electrical potential difference exists between the metal grating web and the upper face of the sealing web, which is wetted with water, of the roof when the voltage source is switched on.

7. Leak testing and leak localization arrangement according to claim 1 wherein the metal grating web is connected to an electrical ground connection.

8. Leak testing and leak localization arrangement according to claim 1 wherein the voltage source is a pulse transmitter.

9. Leak testing and leak localization arrangement according to claim 1 further comprising a lower insulating layer underneath the lower face of the sealing web, wherein the metal grating web is located between the electrically insulating sealing web and the lower insulating layer.

10. Leak testing and leak localization arrangement according to claim 9, further comprising a first and second bituminous layer, wherein the metal grating web is arranged between the two bituminous layers, which are connected to one another and to the lower insulating layer through the metal grating web by heating.

11. Leak testing and leak localization arrangement according to claim 9 further comprising a first and second bituminous layers wherein the metal grating web is arranged under the two bituminous layers which are connected to one another and to the lower insulating layer by heating.

12. Leak testing and leak localization arrangement according to claim 1 wherein the metal grating web is composed of a corrosion-resistant conductive material.

13. Leak testing and leak localization arrangement according to claim 1 wherein the voltage source is connected to at least two mobile sealing web contact plates, and is electrically connected to the metal grating web and in that the mobile sealing web contact plates are placed on the flat roof at points at a distance from one another.

* * * * *